Figure 1:
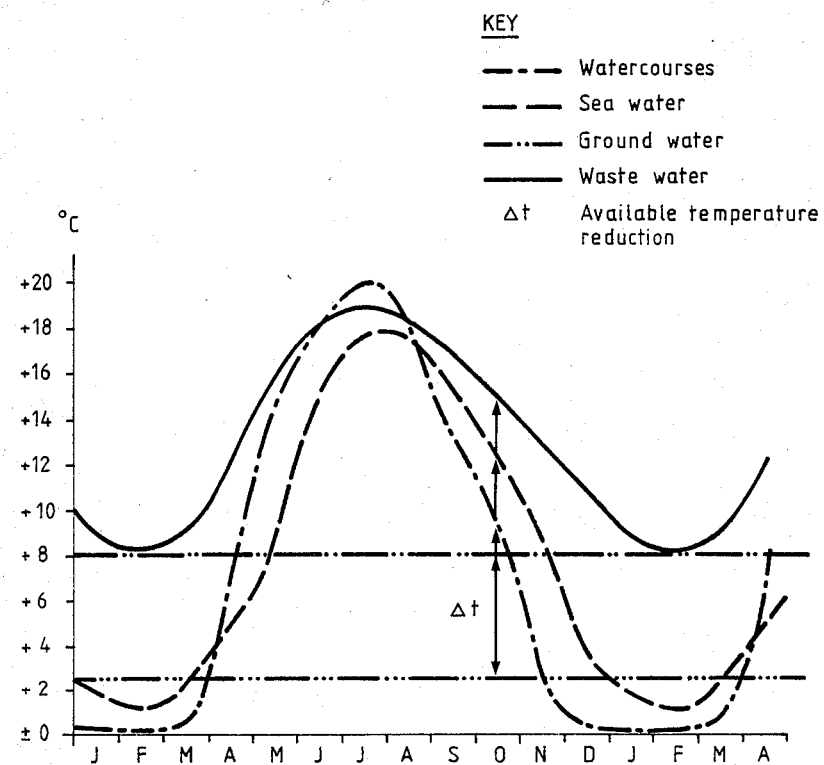

United States Patent [19]

Lemmeke

[11] Patent Number: 4,509,680
[45] Date of Patent: Apr. 9, 1985

[54] METHOD FOR COMBINED UTILIZATION OF HEAT-CONVEYING MEDIA SUCH AS GROUND WATER OR SURFACE WATER OR THE LIKE AS A HEAT SOURCE

[76] Inventor: Leif Lemmeke, Bondevägen 9, 237 00 Bjärred, Sweden

[21] Appl. No.: 413,367

[22] PCT Filed: Dec. 14, 1981

[86] PCT No.: PCT/SE81/00371
§ 371 Date: Aug. 17, 1982
§ 102(e) Date: Aug. 17, 1982

[87] PCT Pub. No.: WO82/02085
PCT Pub. Date: Jun. 24, 1982

[30] Foreign Application Priority Data

Dec. 18, 1980 [SE] Sweden ............................. 8008906

[51] Int. Cl.³ ............................................. G05D 23/00
[52] U.S. Cl. .................................. 237/2 B; 62/238.6; 62/260
[58] Field of Search .................. 62/238.6, 238.7, 260, 62/79; 165/45; 237/2 B

[56] References Cited

U.S. PATENT DOCUMENTS 3,498,072 8/1968 Stiefel ........................... 62/238.6 X
3,807,190 4/1974 Grant ............................... 62/260 X
4,375,831 3/1983 Downing, Jr. ................ 237/2 B X Primary Examiner—William E. Wayner
Assistant Examiner—J. Sollecito

[57] ABSTRACT

The present invention relates to a method for combined utilization of heat-conveying media, such as ground water or surface water or the like, as a heat source comprising a heat store 5 in the ground water reservoir 2 and a heat exchange device 4 equipped with attendant elements. The method is characterized in that water is removed from a watercourse, lake or sea 1 during the summer and this water is then conveyed to a heat exchange device 4 where the heat is transferred to the ground water which is caused to circulate in a closed system, the heat store 5 in the ground water reservoir 2 thus being charged, following which the heated ground water is removed from the heat store 5 during the remainder of the year in time with variations in the heat requirement as the ground water is caused to circulate via a heat exchange device 3 so that the heat store 5 in the reservoir 2 is discharged and stored heat is given off.

1 Claim, 3 Drawing Figures

METHOD FOR COMBINED UTILIZATION OF HEAT-CONVEYING MEDIA SUCH AS GROUND WATER OR SURFACE WATER OR THE LIKE AS A HEAT SOURCE

The present invention relates to a method for combined utilization of heat-conveying media, such as ground water, surface water or the like, as a heat source.

When using a heat pump for satisfying a certain heat requirement, the temperature of the heat source is of decisive importance to operating economy. In regard to the majority of natural heat sources such as ground, water and air, the temperature displays seasonal variations in step with solar radiation. The heat requirement for heating, etc. is normally in opposition to these natural heat assets. Through seasonal storage of heat-conveying media at "summer temperature" it is therefore possible to ensure favourable and stable operating conditions throughout the whole year.

For the large-scale use of natural heat sources the utilization of water is of particular interest since as a heat-conveying medium it can be supplied directly to the heat pump. Temperature variations in the surface water from lakes and watercourses follow variations in the air temperature with an insignificant delay, as will be evident from the following graphs in FIG. 1. As a result of these variations the temperature throughout the summer (approx. 4 months) is above +14° C. and climbs up to +20° C. while the temperature during the greater part of the winter (about 4–5 months) is below +3° C. Corresponding temperature variations are obtained in respect of sea water in shallow areas. In relation to the temperature of watercourses there is nevertheless a certain delay in the variations and neither are the maximum and minimum temperatures equally pronounced.

This inertia in adaptation to the ambient temperature is due to the large heat capacity of the water masses. In areas of deeper water or where stratification exists as a result of differences in salt content, the temperature variations in sea water may differ substantially from what is shown in the following graphs. As a result of the practically complete equalization of seasonal temperature variations which normally takes place in connection with passage through the upper ground cover, the ground water maintains a constant temperature of about +8° C. This corresponds to the mean annual ground surface temperature (cf. graphs). The ground water consequently comprises a stable heat source for heat pumps. Apart from the natural heat sources described above it is also possible to utilize waste water as a heat source. Sewage also displays seasonal temperature variations between +8° C. and +18° C., see graphs below. Considerable differences may nevertheless occur as a result of the addition of industrial effluent or melt water and ground water or drainage water seepage, etc.

The temperature shown in FIG. 1 represent conditions in south Sweden. In regard to conditions further north or south, somewhat different temperatures apply throughout.

The method according to the invention is characterized by what is evident from the patent claims enclosed.

Figure 2:
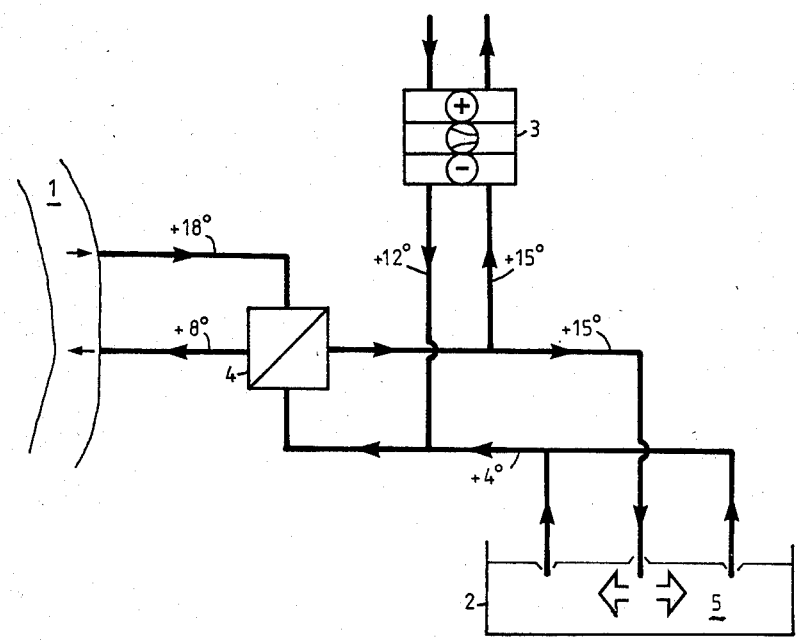
Figure 3:
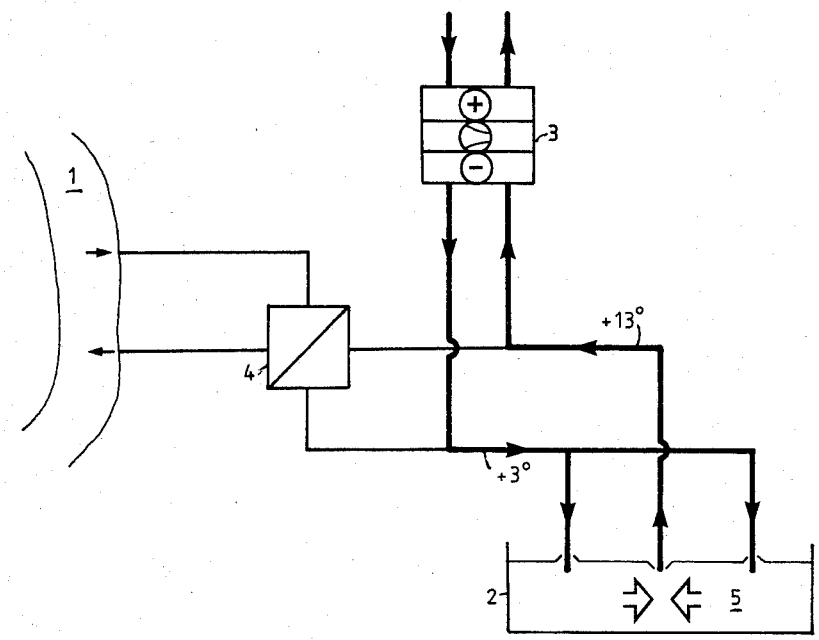

The invention will now be described in greater detail with reference to the enclosed drawing which relates to a circuit diagram of a heat supply system in which FIG. 2 shows the operating conditions in summertime and FIG. 3 shows the operating conditions in wintertime and the attendant "pulsating magazine" heat storage diagrams.

During the summer half-year the temperature of the surface water is appreciably higher than the ground water temperature. During this period it is therefore more advantageous to utilize the surface water as a heat source for heat pumps. During the remainder of the year it is also possible to utilize the large heat content of the surface water in the summer by storing the heat in ground water reservoirs. This can be done by delivering warm water in the summer to charge the reservoir. Simultaneously, a corresponding volume of cooled water, which can be diverted to a watercourse or lake 1, is removed. The warm water can then be stored with no noticeable heat losses in the ground water reservoir 2. During the winter half-year the heated water can then be removed from the reservoir 2 and delivered to the heat pump plant 3 concurrently with heat requirement variations. Cold water is simultaneously transferred to the reservoir 2. In this way a continuous hydraulic balance is maintained on an annual basis. Technically, the reservoir 2 can be designed as a "pulsating magazine" where the warm water is delivered and removed in centrally situated wells while cold water is simultaneously removed and delivered in peripherally situated wells, as will be evident from the following diagram which indicates the functional principle of "pulsating magazine" heat storage.

Heating of the ground water as well as contact with the oxygen of the air may give rise to chemical reactions which may lead to precipitation and the danger of clogging in the wells. In the present case the temperature variations are so small that they are not considered to constitute a problem. On the other hand, to avoid acidification of the ground water, circulation of this water in a closed system would no doubt be warranted. Heat transfer from the surface water must then take place in a heat exchanger 4, which entails a heat loss of 2°–3° C. During the four warmest summer months the surface water temperature normally varies between +14° C. and approx. +20° C., cf. the graphs in FIG. 1. The mean temperature then amounts to about +17° C. Through heat exchange the ground water may then obtain a mean temperature of about +14°–15° C. Through heat losses during the storage phase it is judged that the temperature will be further lowered to about +12°–13° C. The available temperature reduction at the heat pump 3 will then be slightly more than 10° C. throughout the whole year.

In order to be able to extract a certain desired amount of power *from* a heat source 1 by means of a heat pump 3 the delivery of a flow of definite magnitude with a certain temperature reduction of the heat source is required. When utilizing a heat source of comparatively high temperature, favourable operating conditions are attained. The heat source can then be used in such a manner that the temperature is reduced by a maximum (approx. 10°–12° C.) to a level just above the freezing point. This restricts the flow through the plant which permits smaller dimensioning of the heat pump evaporator, transfer pipes, extraction devices, etc. Alternatively, the temperature of the heat source can be reduced to a limited extend (about 3°–5° C.) so that a comparatively high output temperature is obtained. The "temperature lift" of the heat pump will then be reduced and a higher coefficient of performance is attained.

In order to achieve a natural heat source which maintains "summer temperature" all the year round, a supply system has been developed comprising a heat store 5 in the ground water reservoir 2 and a heat exchange plant 4 with attendant transfer pipes, inlet and outlet devices, etc. The device is designed to be operated in such a manner that warm surface water or sea water is removed from a watercourse, lake or sea 1 during the summer. This water is delivered to the heat exchange plant 4 where the heat is transferred to the ground water which is caused to circulate in a closed system and thus charge the heat store 5. During the remainder of the year the heated ground water is extracted from the heat store 5 concurrently with the heat requirement variations. The ground water is then caused to circulate via a heat pump plant 3 where the stored heat is given off. The heat store 5 in the ground water reservoir 2 is thus discharged. FIGS. 2 and 3 with the attendant pulsating storage diagrams indicate the procedure according to the invention.

I claim:

1. A method of operating a heating system including a ground water reservoir, a heat store in said ground water reservoir, a heat exchanger outside said ground water reservoir but operatively connected thereto, and heat pump means connected to said heat store, comprising the steps of:

in summer circulating water from a surface water source through said heat exchanger to thereby transfer heat from said removed water to said ground water reservoir to charge said heat store; and during the remainder of the year discharging said heat store by circulating water from the thus heated ground water reservoir through said heat pump means.

* * * * *